United States Patent [19]

Smith, Jr. et al.

[11] 4,326,802

[45] Apr. 27, 1982

[54] DUAL MONOCHROMATOR TYPE OF SPECTROANALYSIS SYSTEM

[75] Inventors: Stanley B. Smith, Jr., Westford; Robert G. Schleicher, Winchester; Allan G. Dennison, Acton, all of Mass.

[73] Assignee: Instrumentation Laboratory Inc., Lexington, Mass.

[21] Appl. No.: 118,916

[22] Filed: Feb. 6, 1980

[51] Int. Cl.³ .......................... G01N 21/73; G01J 3/18
[52] U.S. Cl. ................................... 356/316; 356/328; 356/333; 356/334
[58] Field of Search .............. 356/315, 316, 328, 329, 356/333, 334; 74/569

[56] References Cited

U.S. PATENT DOCUMENTS

| | | | |
|---|---|---|---|
| 2,453,164 | 11/1948 | Swings | 356/305 |
| 2,670,652 | 3/1954 | Sherman | 356/333 |
| 2,931,266 | 4/1960 | Martin | |
| 2,945,953 | 7/1960 | Martin | 356/333 X |
| 3,003,366 | 10/1961 | Herbst et al. | 74/569 |
| 3,229,563 | 1/1966 | DeMey | 356/334 |
| 3,306,158 | 2/1967 | Makabe et al. | 356/334 |
| 3,390,604 | 7/1968 | Makabe | 356/334 |
| 3,414,356 | 12/1968 | Cary | 356/334 |
| 3,659,945 | 5/1972 | Roche et al. | 356/334 |
| 3,915,571 | 10/1975 | Winter | 356/333 |

OTHER PUBLICATIONS

"Analytical Applications of the Ebert Spectrograph with Order Sorter at High Dispersion Settings" Jarrell-Ash Co. News Letter, Jul. 1955, 12 p.
Analytical Chemistry, vol. 48, No. 2, Feb. 1976, Spillman et al., pp. 303-311.
Spectrochimica Acta, vol. 29B, No. 9-10, Sep.-Oct. 1974, pp. 249-261 Kornblum et al.

*Primary Examiner*—Vincent P. McGraw

[57] ABSTRACT

A highly accurate, rapid scanning monochromator type of spectroanalysis system employs a source of the plasma emission type, a filtering monochromator, and a resolving monochromator. Each monochromator has a dispersing element and the two dispersing elements are arranged to be moved simultaneously but at different rates such that the spectral order of radiation from the source as dispersed by the first dispersing element is different from the spectral order of radiation dispersed by the second dispersing element, together with selectively operable control means for moving the two dispersing elements simultaneously and at the same rate.

37 Claims, 14 Drawing Figures

DUAL MONOCHROMATOR TYPE OF SPECTROANALYSIS SYSTEM

This invention relates to spectroanalytical systems, and more specifically to emission spectroscopy systems particularly useful with sources of the plasma type.

In spectroanalytical systems, samples to be analyzed are excited in various ways, for example, by burning the sample in a flame; by placing the sample in an electric arc or spark; and by introducing the sample into a "plasma". Sufficient heating of the sample causes the element of interest to dissociate from its compounds and some of its atoms are "excited" and give off radiation at specific wavelengths. The intensity of such radiation is proportional to the concentration of the element in the sample. Spectroanalytical systems of the plasma emission type provide capability for analyses of many different elements, including analyses of "refractory" elements such as phosphorus, boron, tungsten, zirconium, and uranium, which cannot be atomized adequately by conventional flame or furnace techniques. Plasma emission systems, however, produce complex spectra and are subject to interference from stray light. Also, the plasma source has a temperature gradient along its axis.

In accordance with one aspect of the invention, there is provided a highly accurate, rapid scanning monochromator type of spectroanalysis system which can rapidly determine a sequence of elements in a sample. The system employs a source of the plasma emission type, a filtering monochromator, and a resolving monochromator. Each monochromator has a dispersing element and the two dispersing elements are arranged to be moved simultaneously but at different rates such that the spectral order of radiation from the source as dispersed by the first dispersing element is different from the spectral order of radiation dispersed by the second dispersing element. In a preferred embodiment, the drive system also includes selectively operable control means for moving the two dispersing elements simultaneously and at the same rate. In a particular embodiment, spectral order suppression means are provided and operated concurrently with the drive control selection to suppress a predetermined wavelength range of radiation. In that particular embodiment, the resolving monochromator is operated in first order mode when the wavelength of interest is above 3650 angstroms and in second order mode when the wavelength of interest is below 3650 angstroms, and the spectral order suppression means in the form of a UV filter is inserted in the optical path to suppress wavelengths below 3650 angstroms. In that particular embodiment, the average scanning time between elements to be determined is three seconds, and if a total integration time of two seconds is chosen the total time for each element is five seconds, and analysis of ten elements in one sample can be accomplished in less than one minute.

In accordance with another aspect of the invention, the system includes a calibration source (in a particular embodiment, a low pressure mercury source which has well defined emission lines in both the ultraviolet and visible wavelength ranges). Radiation from the calibrating source is directed through the entrance aperture of the system and used to wavelength calibrate the controller.

In accordance with still another feature of the invention, the system includes a controller responsive to the radiation sensor, the dispersing elements are driven by a first stepping motor, and beam shifting means disposed between the second dispersing element and the exit aperture is driven by a second stepper motor. In an analytical sequence, the controller sequentially operates the first stepper motor, in one direction to move the grating to the calculated wavelength position. The second stepper motor then moves the beam shifting means to shift the beam at the exit aperture in steps that are smaller than the amount the beam is shifted by a single step of the first stepper motor, initially in multiple step increments and finally in single step increments to maximize the intensity of radiation at the exit aperture. In a particular embodiment, the beam at the exit aperture is shifted by the first stepper motor at a rate of 0.05 angstrom per step (in second order) and 0.1 angstrom (in first order) while the second stepper motor shifts the beam 0.01 angstrom per step in first order.

The order selection mechanism includes two cam follower assemblies coupled to one of the dispersing elements, and the drive means includes cooperating camming means, the control means selectively placing one of the two cam follower assemblies in operative engagement with the cooperating camming means which is driven by the first stepper motor. One cam follower assembly has a lever arm twice the length of the other cam follower assembly. In a particular embodiment, each cam follower assembly includes a carrier member that has a conical surface at one end and a spherical surface eccentrically located relative to the axis of the conical surface at its opposite end. The conical surface of the carrier member is received in a conical seat of a support member so that rotation of the carrier member changes the effective length of the cam follower assembly.

In accordance with still another feature of the invention, the system includes means for scanning along an axis of an elongated radiation source so that radiation from different locations along that axis may be directed to the entrance aperture. This source scanning capability permits effective analyses of different elements as a function of the temperature in the plasma plume. In a particular embodiment, the source scanning means includes a lens and mirror mounted for coordinated movement, and the scanning means is movable to a calibration position in which radiation from the calibration source is reflected into the entrance aperture of the monochromator system.

Thus there is provided an emission spectrometer system particularly useful for multielement analysis of plasma excited samples that includes among its features a ganged pair of scanning monchromators with a spectral order selection capability, a vernier adjustment capability and a source scanning capability.

Other features and advantages of the invention will be seen as the following description of a particular embodiment progresses, in connection with the drawings, in which.

DESCRIPTION OF PARTICULAR EMBODIMENT

Figure 1:
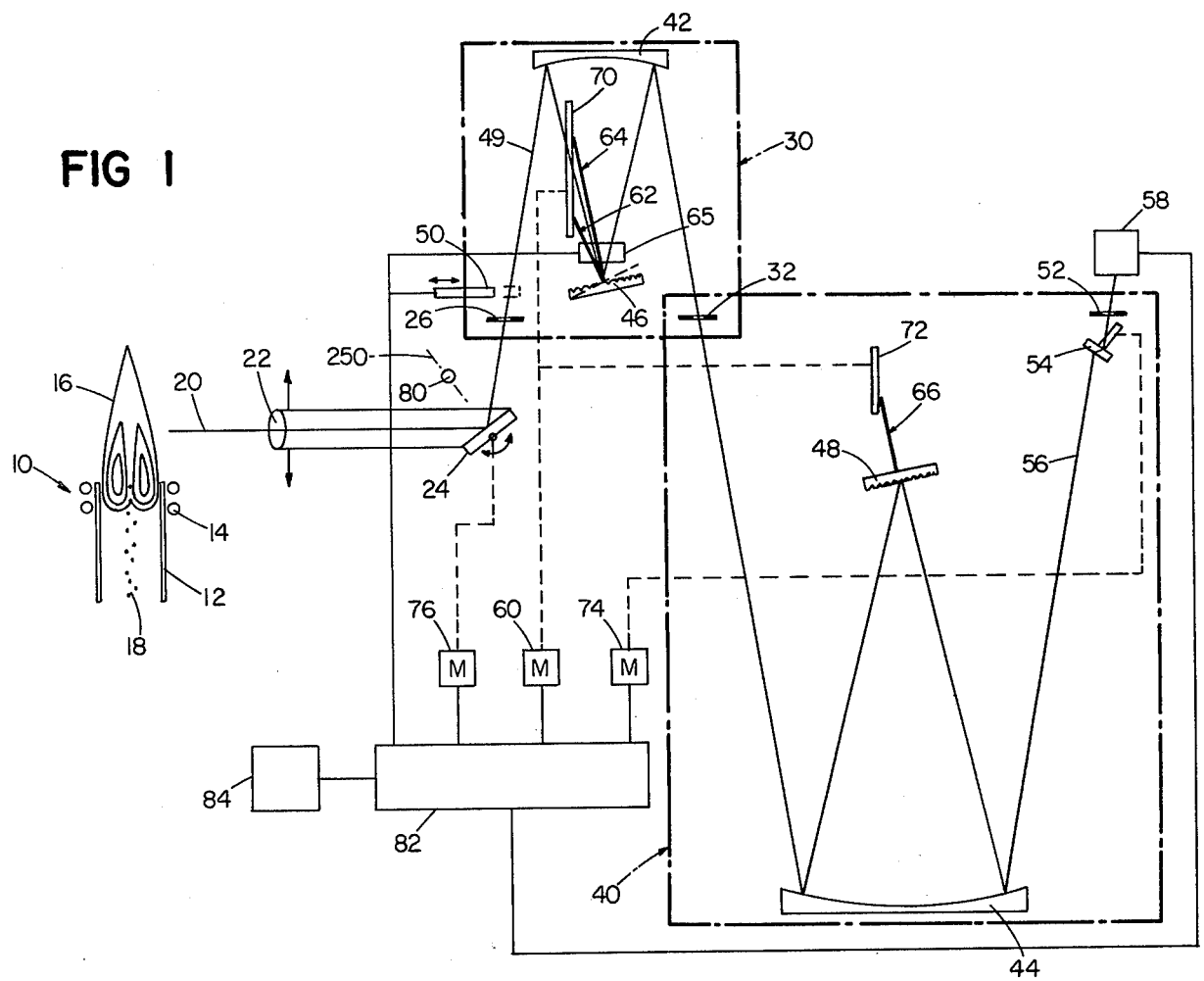
FIG. 1 is a diagram of a spectroanalysis system in accordance with the invention.

With reference to FIG. 1, the spectrometer system includes an induction coupled plasma source 10 that has tubular plasma chamber 12 surrounded by induction coil 14. Coil 14 is energized at a frequency of about 27.12 megahertz and excites a flow of argon gas to establish elongated plasma plume 16. The sample 18 to be analyzed is introduced in aerosol form into the plasma 16 and excited to spectroemissive levels.

Resulting radiation from plasma source 10 is focused by lens 22 and reflected by mirror 24 through the entrance aperture 26 of 1/6 meter focal length filtering monochromator 30. The exit aperture 32 of monochromator 30 is coincident with the entrance aperture of ⅓ meter focal length resolving monochromator 40. Each monochromator includes a spherical collimating mirror, 42, 44 respectively, and a dispersing element, 46, 48 respectively, in the form of a planar reflecting grating. Located behind entrance aperture 26 of filtering monochromator 30 in beam path 49 is ultraviolet filter plate 50 that is movable between a retracted position and an advanced position (shown in dashed line) in the radiation beam. Disposed in front of exit aperture 52 of resolving monochromator 40 is refractor plate 54 that is mounted for rotation about an axis perpendicular to the radiation beam 56; and positioned behind exit aperture 52 is a radiation detector 58 in the form of a photomultiplier tube.

Gratings 46, 48 are mounted for rotation about pivot axes that extend perpendicular to the planes of radiation beams 49, 56 and are driven in rotation by a common drive in the form of stepper motor 60. The filter monochromator grating 46 has two sine arm assemblies 62, 64 and its scan rate is switchable by control 65 between 0.05 angstrom per step (used in first order at wavelengths between 1800 and 3650 angstroms) and 0.1 angstrom per step (used in first order at wavelengths between 3650 and 9000 angstroms). The resolving monochromator grating 48 has a single sine arm assembly 66, the lengths of sine arm assemblies 62 and 66 being the same. Stepper motor 60 moves planar sine arm drive surfaces 70 and 72 in synchronism, surface 70 rotating grating 46 at a scan rate determined by the selected sine arm 62 or 64 and surface 72 rotating grating 48 through its sine arm 66. Refractor plate 54 is rotated by stepper motor 74 and moves the radiation beam 56 across exit slit 52 at a rate of about 0.01 (0.02) angstrom per step. An assembly of lens 22 and mirror 24 defines beam 20 and is rotated about the mirror axis by motor 76, enabling the plasma plume 16 to be scanned in a vertical direction. Mercury calibration source 80 is mounted above entrance beam 20, and mirror 24 may be further rotated by motor 76 to a position where mirror 24 reflects radiation from source 80 along radiation path 49 through entrance slit 26 into the monochromator array. Operation of motors 60, 74, and 76 are coordinated by controller 82 as a function of the output of sensor 58 which is processed by controller 58 with results being presented by output device 84, e.g., a visual display or a pointer.

Figure 2:
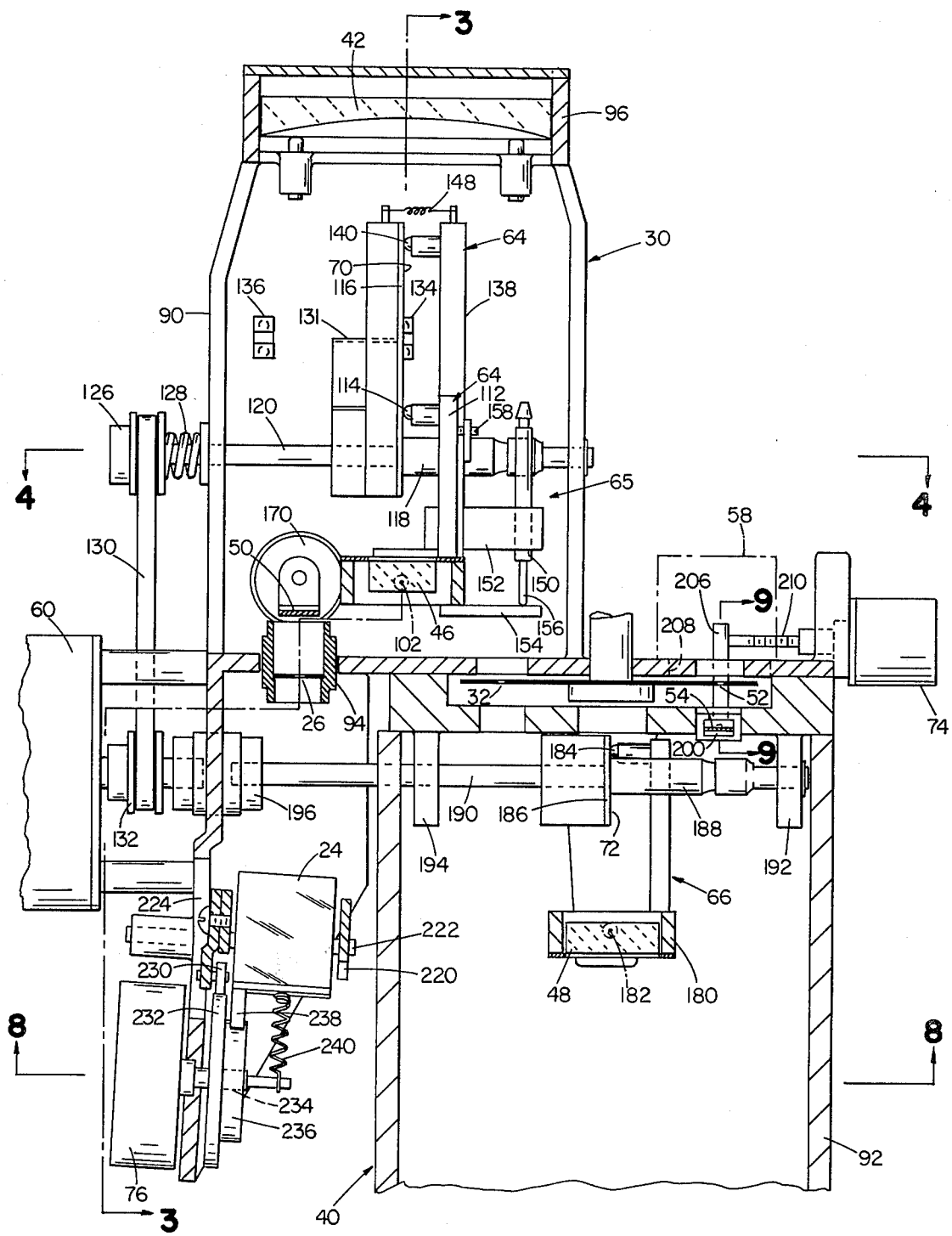
FIG. 2 is a sectional view of portions of the spectroanalysis system taken along the line 2—2 of FIG. 3.
Figure 3:
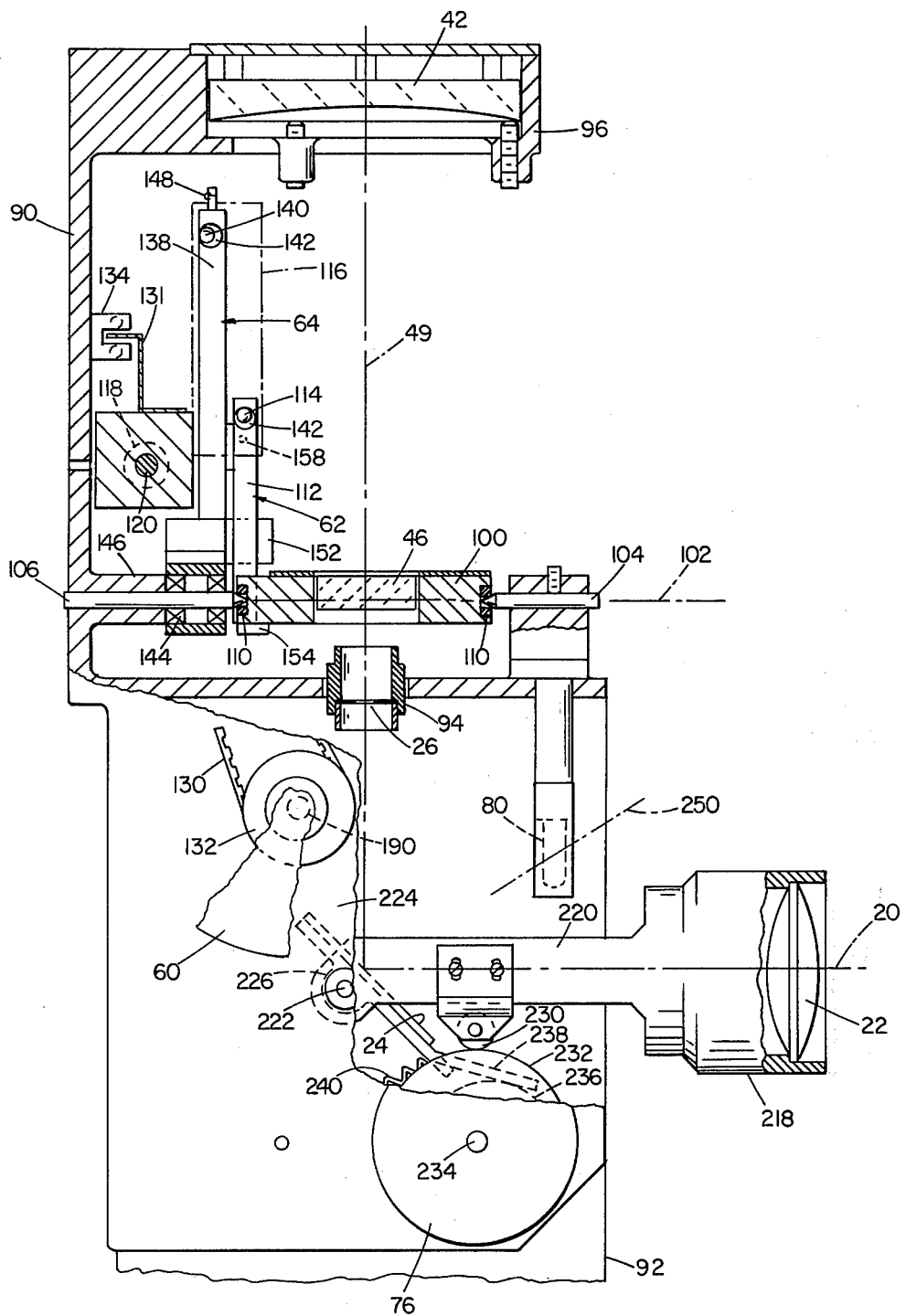
FIG. 3 is a sectional view taken along the line 3—3 of FIG. 2.
Figure 4:
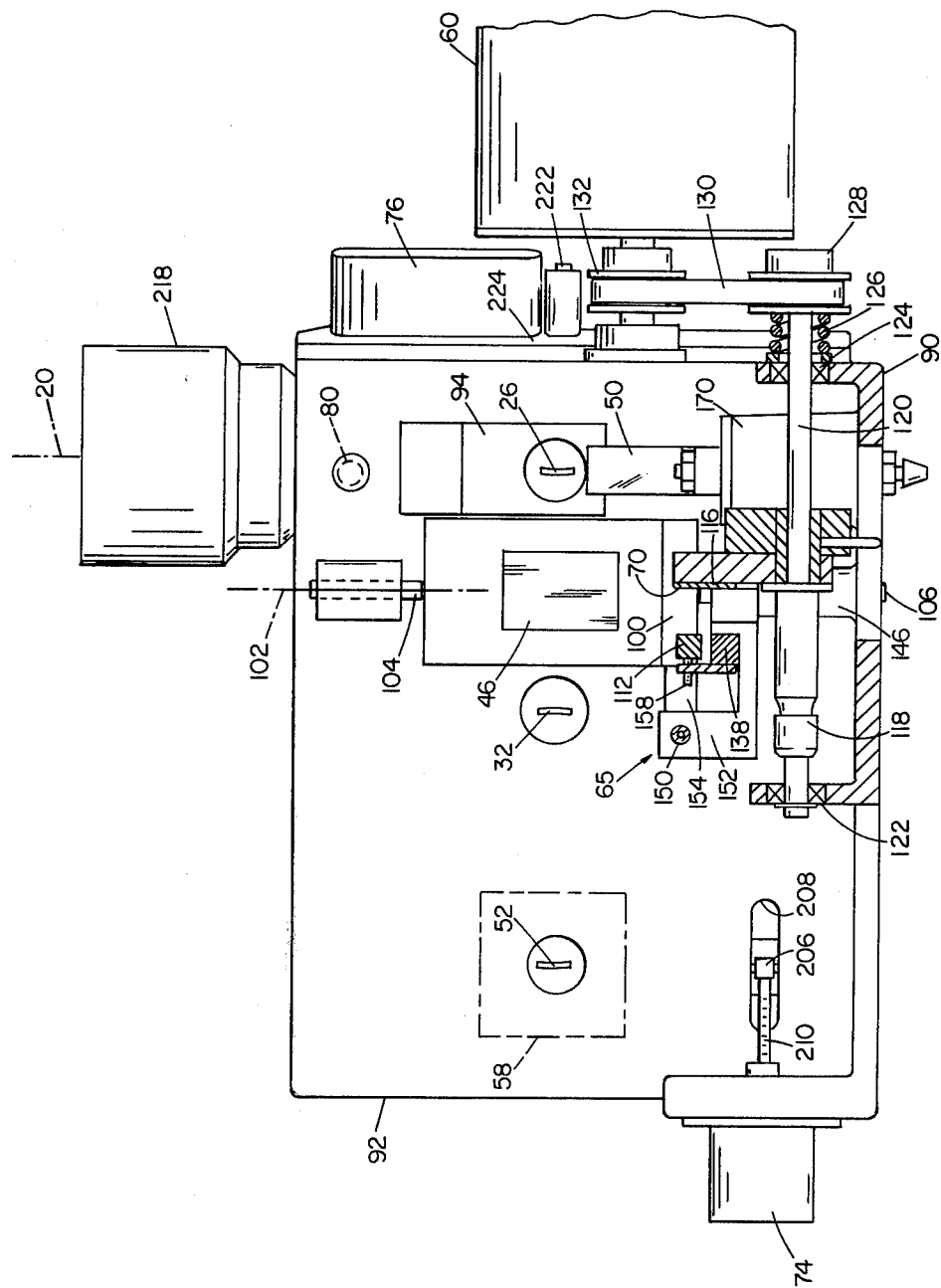
FIG. 4 is a transverse sectional view taken along the line 4—4 of FIG. 2.

Further details of the spectroanalysis system may be seen with reference to the sectional views of FIGS. 2, 3, and 4. The housing of filtering monochromator 30 is shown at 90 and the housing of resolving monochromator 40 is shown at 92. Entrance aperture 26 is defined by an adjustable slit structure 94 and spherical collimating mirror 42 is supported by conventional support structure 96. Diffraction grating 46 is blazed at 2500 angstroms and is mounted in holder 100 for rotation about axis 102 defined by support rods 104, 106, each of which has a conical end surface 108 that is received in a sapphire bearing 110 secured to grating holder 100. Holder 100 is biased for rotation in a counterclockwise direction as viewed in FIG. 2 by springs (not shown) and has fixedly attached a sine arm assembly 62 that includes an arm 112 and a spherical follower 114. Follower 114 is biased against planar surface 70 of glass plate 116 and that plate is mounted on nut 118 and moved by precision lead screw 120 along the axis of that screw. Lead screw 120 is supported in bearings 122, 124 and is connected to sprocket 126 through spring coupling 128. Sprocket 126 is connected by drive belt 130 and sprocket 132 to stepper motor 60. Secured to and movable with plate assembly 116 is sensor arm 131 (FIG. 3) which, in cooperation with sensor assemblies 134, 136, limits the extent of movement of drive assembly 116 along the axis of lead screw 120.

The second sine bar assembly 64 includes an arm 138 about twice the length of arm 112 with a similar stainless steel ball bearing 140 eccentrically mounted on a rotatable support 142. Assembly 64 is supported for rotation about grating axis 102 by bearings 144 (FIG. 3) mounted on boss 146 in which grating support shaft 106 is housed. Biasing spring 148 maintains follower 140 in engagement with surface 70.

Figure 5:
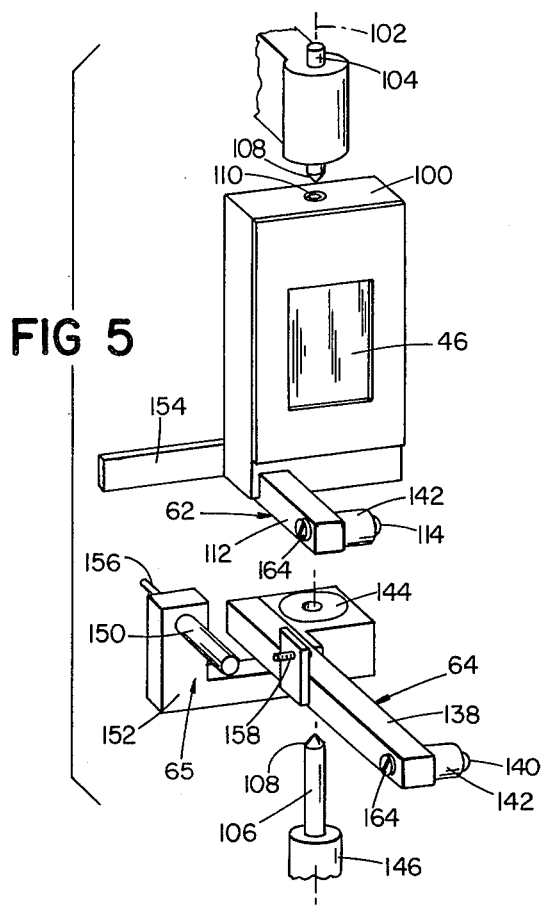
FIG. 5 is a perspective exploded view of components of the switchable order selection mechanism of the filtering monochromator in the system shown in FIG. 1.

Further details of the sine arm selection control 65 may be seen with reference to FIG. 5. That control includes pneumatic cylinder 150 that is carried by arm 152 attached to sine arm assembly 64. Projection 154 is secured to grating holder 100 and when piston rod 156 of cylinder 150 is extended, it engages grating holder projection 154 and rotates holder 100 about grating axis 102 to a position defined by adjustable stop 158 carried by sine arm 138.

Figure 6:
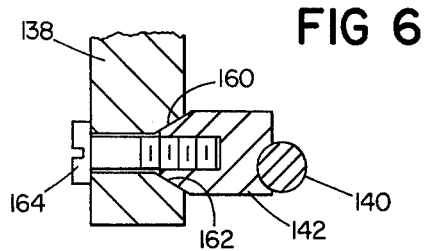
FIG. 6 is a sectional view of a portion of sine bar structure shown in FIG. 5.

Further details of the sine arm length adjustment mechanism incorporated in sine arms 62, 64, and 66 may be seen with reference to FIG. 6. Each follower has a spherical surface defined by a stainless steel ball bearing that is mounted on the face of support 142. Support 142 has a conical surface 160 and bearing 140 is eccentrically mounted with respect to the axis of surface 160. Surface 160 is received in conical seat 162 of the sine arm and is secured in position by bolt 164. Rotation of support 142 adjusts the distance between the contact point of follower bearing 114, 140 from the axis 102 of rotation of grating 46. Followers 114 and 140 are adjusted so that the two sine bar systems are linear and track with one another, the effective length of sine bar assembly 64 being approximately twice the effective length of sine bar assembly 62 in the Ebert mounting.

Figure 7A:
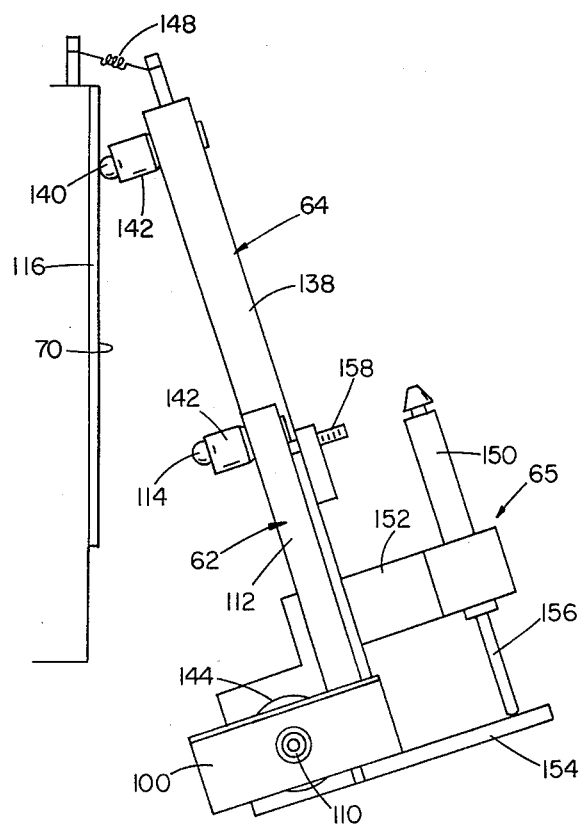
FIGS. 7A and 7B are diagrammatic views showing operation of the order selection mechanism of FIG. 5.
Figure 7B:
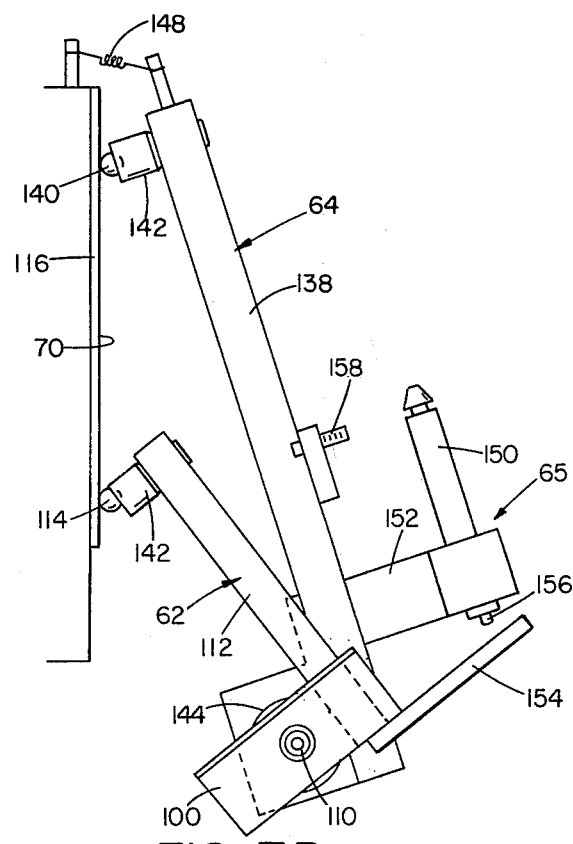

Further details of the switchable order control 65 may be seen with reference to FIGS. 7A and 7B. In the position shown in FIG. 7A (with piston rod extended) grating 46 is rotated about 0.05 angstrom for each step of stepper motor 60, and a second order spectral line of the selected wavelength is passed through slit 32. When the control system 65 withdraws piston rod 156, the biasing springs of grating holder 100 rotate the grating to the position shown in FIG. 7B so that the second order spectral line of the same wavelength (and the first order spectral line of twice that wavelength) is passed through slit 32. This shifts the spectrum control from the longer sine arm assembly 64 to the shorter sine arm 62, increasing the shift of the spectrum at slit 32 by a factor of two so that each step of wavelength stepper motor 60 shifts that spectrum 0.1 angstrom. In the position shown in FIG. 7B, rotation of grating holder 100 is controlled solely by sine arm assembly 62, and sine arm assembly 64 merely follows the transversing movement of camming surface 70 as controlled by biasing spring 148. With selector cylinder 150 energized so that piston rod 156 is advanced against projection 154, grating holder 100 is rotated to the position shown in FIG. 7A with sine arm assembly 62 firmly positioned against stop 158 so that rotation of grating 46 is controlled solely by the longer sine arm assembly 64.

UV filter plate 50 is mounted on pneumatic control 170 and is interposed across entrance slit 26 concurrently with the switching of sine arm assemblies 62 and 64. Those actions occur at a wavelength of about 3650 angstroms, since the filtering monochromator is generating detectable second order spectrum at wavelengths above 3650 angstroms and this incident radiation of lower wavelength is blocked by filter 50.

Figure 8:
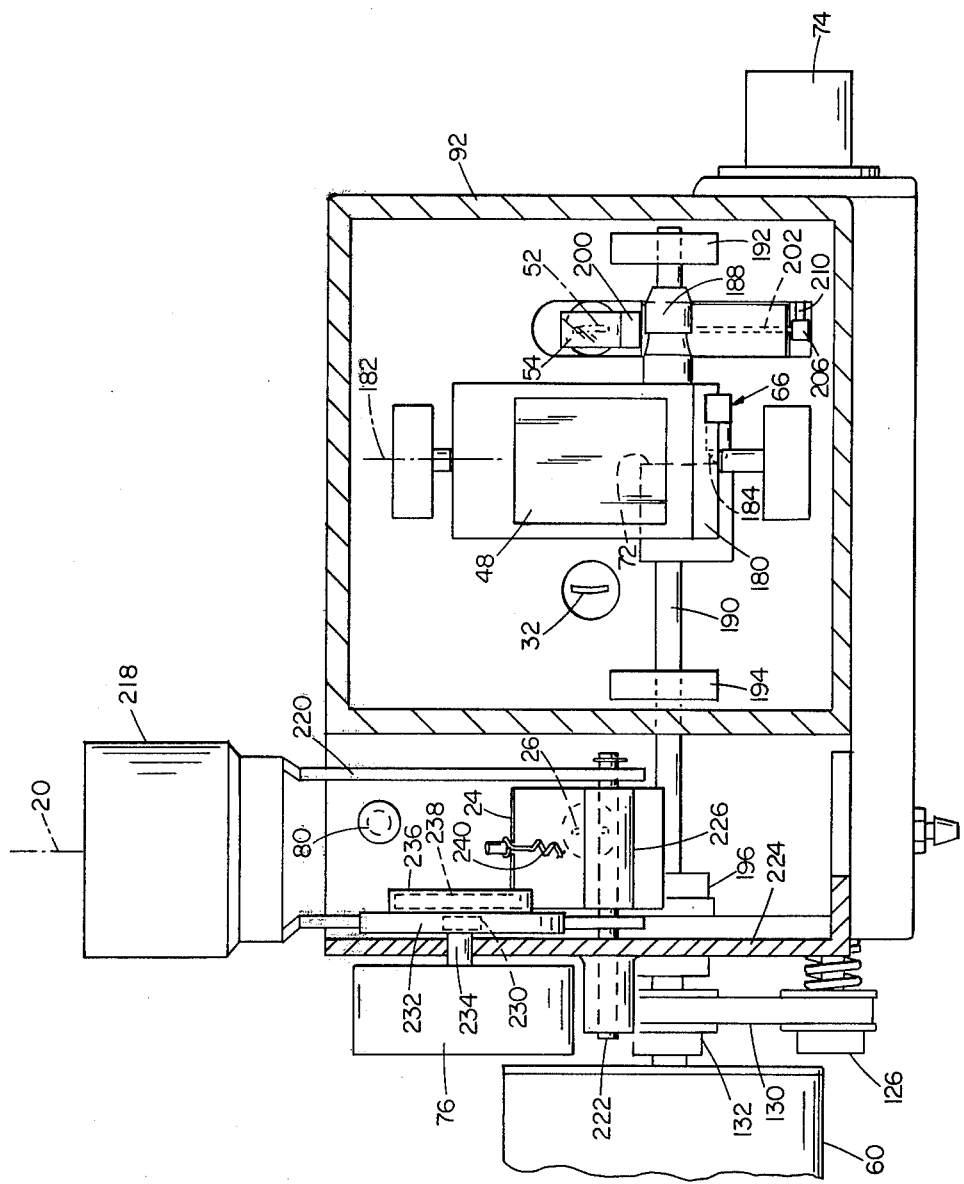
FIG. 8 is a transverse sectional view taken along the line 8—8 of FIG. 2.
Figure 9:
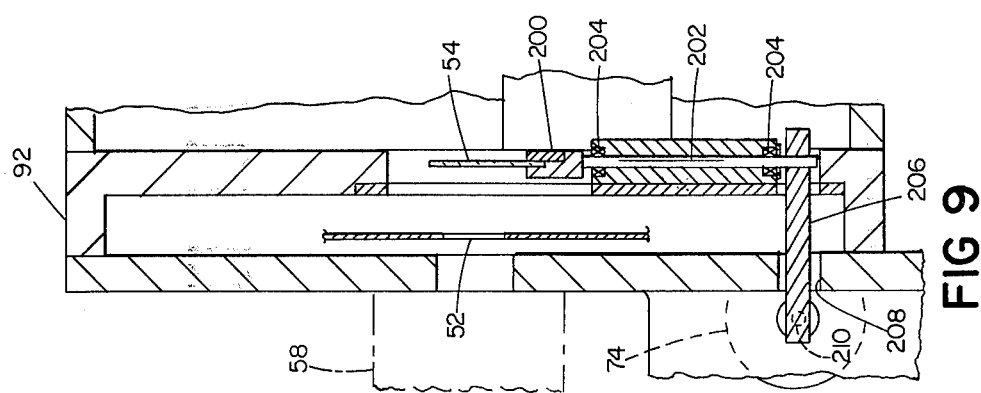
FIG. 9 is a sectional view (on an enlarged scale) taken along the line 9—9 of FIG. 8.

Details of resolving monochromator 40 may be seen with reference to FIGS. 2, 8, and 9. Grating 48 is blazed at 5000 angstroms and is supported in holder 180 for rotation about grating axis 182 by a support mechanism similar to the support mechanism for filtering monochromator grating 46. Sine arm assembly 66 is fixed to holder 180 and includes similar follower 184 biased against surface 72 of glass plate 186 and is driven by nut structure 188 carried by precision lead screw shaft 190 mounted for rotation in bearing structures 192, 194. Shaft 190 is connected to sprocket 132 by coupling 196 and driven by stepper motor 60 such that lead screws 120 and 190 are rotated in synchronism.

Refractor plate 54, a quartz plate, one millimeter in thickness, is mounted on holder 200 and holder 200 is mounted on shaft 202 and supported for rotation about the axis of shaft 202 by bearing assembly 204. Secured to the lower end of shaft 202 is lever arm 206 which extends through slot 208 and is biased against screw shaft 210 of Vernier linear stepper motor 74. Stepper motor 74 moves refractor plate 54 to shift the spectrum at exit slit 52 (0.01 (0.02) angstrom shift per step) and provides a total excursion of 2.5 (5) angstroms (250 steps).

Details of the mechanism for shifting entrance beam 20 to scan source 16 may be seen with reference to FIGS. 2, 3, and 8. Lens 22 is mounted in holder 218 secured to arms 220 which are supported for rotation on shaft 222 that projects from support wall 224. Mirror 24 is also mounted for rotation about shaft 222 on bushing 226. Follower 230 is carried by lens support 220 and engages cam 232 which is mounted for rotation on shaft 234. Also mounted on shaft 234 is cam disc 236. Follower 238 (secured to mirror 24) is biased against cam surface 236 by spring 240. Shaft 234 is driven in rotation by motor 76 to shift the position of entrance axis 20, mirror cam 236 moving mirror 24 at one-half the rate that lens cam 232 moves lens 22. This control provides excursion of the entrance beam 20 along the axis of the plasma source 10 a distance of about four centimeters and about one centimeter further movement of mirror 24 to a calibration position in alignment with mercury source 80.

Figure 10:
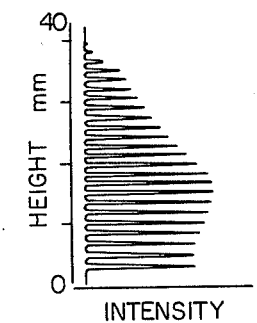
FIG. 10 is a plot of radiation intensities along the axis of the plasma source in the system shown in FIG. 1.

The plot shown in FIG. 10 is a scan along the axis of plasma plume 16 of the intensity of a 3248 angstrom line (copper) showing the effect of changing the observation height. The profile information of the copper line, as shown in FIG. 10, indicates that it is most intense in the region of 16–18 millimeters above the torch. Other spectral lines show similar but differing intensity profiles. Thus, entrance beam 20 can be scanned along the vertical axis of plume 16 as a function of the intensity profile of particular elements.

Figure 11:
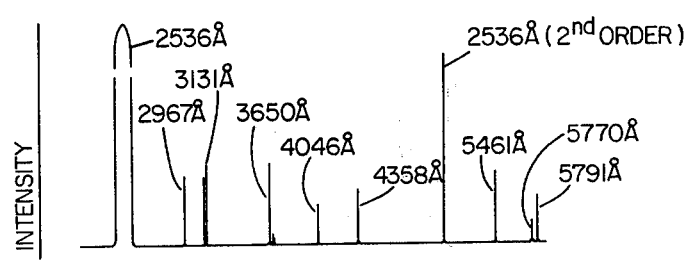
FIG. 11 is a plot of the spectrum of the calibration source in the system shown in FIG. 1.

Shown in FIG. 11 is the emission spectrum of low pressure mercury source 80. Mirror 24 is rotatable to a calibration position in which radiation along axis 250 from source 80 is reflected in through entrance aperture 26 into the monochromator system. As indicated in FIG. 11, source 80 has well defined emission lines in both the ultraviolet and visible wavelength ranges. Source 80 is used for three purposes: the 3650 A triplet lines are used as a reference index; the 2536 (2nd), 3650 (1st and 2nd), 4358 (1st and 2nd), and 5770 (1st) angstrom lines are used for calibrating controller 82 and motors 60 and 74 in terms of outputs from sensor 58 as the monochromator system is scanned through the ultraviolet and physical wavelength ranges; and the 4046 angstrom line is used to fatigue photomultiplier 58 between sample analyses.

After the system has been calibrated, during a spectrochemical analysis, controller 82 initially advances stepper motor 60 to the calculated intensity peak position. Motor 60 thus rotates gratings 46 and 48 in synchronism. Where the wavelength of interest is below 3650 angstroms, the filter monochomator is operated in first order mode, utilizing sine arm 62 as indicated in FIG. 7B. An "actual peak" search routine is then accomplished using stepper motor 74. As soon as and when the intensity peak has been established, the resulting intensity data is outputed on output device 84.

Figure 12A:
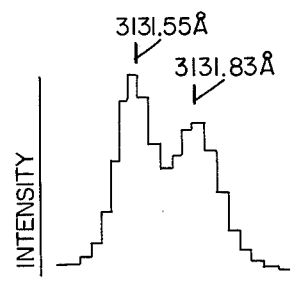
FIGS. 12A and 12B are graphs indicating the nature of spectrograms obtained without and with the vernier beam shifting mechanism, respectively.
Figure 12B:
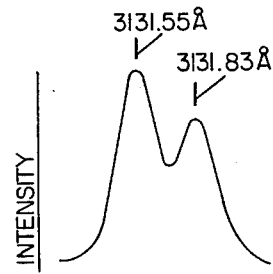

The step resolution of the monochromator system without the use of Vernier refractor plate 52 is shown in FIG. 12A, the mercury doublet (3131.55 angstroms and 3131.83 angstroms) being illustrated. Controller 82 operates stepper motor 74 to rotate refractor plate 54 to shift the spectrum beam at exit slit 52. Each step of motor 74 produces a shift of 0.01 angstrom at exit slit 52. FIG. 12B shows the step resolution of the monochromator system with the use of the Vernier refractor plate system, the same mercury doublet being illustrated. The additional Vernier adjustment provided by refractor plate 54 and motor 74 maximizes the intensity of radiation as sensed by detector 58 to wavelength accuracy of 0.01 (0.02) angstrom.

Between sample analyses, mirror 24 is rotated by motor 76 to refractor lights from source 80 through entrance slit 26; and stepper motor 60 drives camming surfaces 70, 72 to position gratings 46, 48 to the calibrated 4046 angstrom wavelength position. In this standby condition, photomultiplier 58 is "fatigued" by the resulting radiation passing through exit slit 52.

While a particular embodiment of the invention has been shown and described, various modifications will be apparent to those skilled in the art. Therefore it is not intended that the invention be limited to the disclosed embodiment or to details thereof and departures may be made therefrom within the spirit and scope of the invention.

What is claimed is:

1. A spectroanalytical system comprising sample excitation source means, a support, first and second radiation dispersing elements mounted on said support, means defining a stationary entrance aperture, means defining a stationary exit aperture, means on said support for transmitting radiation from said source through said entrance aperture to said first dispersing means along a first optical path, for transmitting radiation dispersed by said first dispersing means to said second dispersing means along a second optical path, and for transmitting radiation dispersed by said second dispersing means through said exit aperture along a third optical path, drive means carried by said support for moving said first and second dispersing elements simultaneously and at different rates such that the spectral order of radiation from said source dispersed by said first dispersing element and transmitted along said second optical path is different from the spectral order of radiation dispersed by said second dispersing element and transmitted along said third optical path through said exit aperture, and a radiation sensor responsive to radiation passing through said exit aperture.

2. The system of claim 1 and further including drive control means for causing said drive means to move said first and second dispersing elements simultaneously and at the same rate.

3. The system of claim 2 and further including spectral order suppression means and means for operating said suppression means concurrently with said drive control means.

4. The system of claim 2 wherein one of said dispersing elements has first and second cam follower assemblies coupled thereto, said drive means includes cooperating camming means for engaging a dispersing element cam follower to move said one dispersing element, and said drive control means includes means to selectively place said first and second cam follower assemblies in operative engagement with said cooperating camming means.

5. The system of claim 4 wherein said one dispersing element is a plane ruled diffraction grating mounted for rotation about a stationary pivot axis parallel to its rulings, and each of said first and second cam follower assemblies includes a sine arm, the effective length of one of said sine arms being twice the effective length of the other sine arm.

6. The system of claim 5 and further including an ultraviolet filter, and means for placing said ultraviolet filter in said first optical path, concurrently with the placing of said first cam follower assembly in operative engagement with said cooperating camming means.

7. The system of claim 1 wherein each said dispersing element includes:

a cam follower coupled thereto, and cooperating camming means carried by said support for moving said cam follower, the surfaces of said cam follower and said camming means being in sliding interengagement as said camming means is moved, and wherein said drive means concurrently moves both of said camming means at the same rate.

8. The system of either claim 1 or 7 wherein said drive means includes a stepper motor.

9. The system of claim 8 wherein said drive means includes a control responsive to said radiation sensor for initially operating said stepper motor in multiple step increments in a first direction to locate an intensity peak, then operating said stepper motor in the opposite direction in smaller multiple step increments to pass said intensity peak in the opposite direction, and then operating said stepper motor in said first direction in single step increments to maximize the intensity of said intensity peak at said exit aperture.

10. The system of claim 1 and further including beam shifting means disposed on said third optical path between said second dispersing element and said exit aperture, and means for moving said beam shifting means to shift the beam at said exit aperture.

11. The system of claim 10 wherein said beam shifting means is a refractor plate mounted for rotation about an axis perpendicular to said third optical path.

12. The system of either claim 10 or 11 wherein said drive means includes a first stepper motor, and a second stepper motor moves said beam shifting means to shift the beam at said exit aperture in steps that are smaller than the amount that said beam is shifted by a single step of said first stepper motor.

13. The system of either claim 4 or 7 wherein each said cam follower includes a carrier member having a conical surface at one end and a spherical surface eccentrically located relative to the axis of said conical surface at its opposite end, a support member that has a conical seat, the conical surface of said carrier member being received in said conical seat so that rotation of said carrier member changes the effective length of said cam follower, and means for fixing said carrier in said seat.

14. The system of claim 1 wherein each said dispersing element is a diffraction grating.

15. The system of claim 1 wherein radiation from said sample excitation source extends along an axis, and further including source scanning means for directing radiation from different locations along said axis to said entrance aperture.

16. The system of claim 15 wherein said source scanning means includes a lens and a mirror mounted for coordinated movement.

17. The system of claim 16 and further including a calibrating radiation source having a plurality of discrete known spectral lines, and means for directing radiation from said calibrating source to said entrance aperture.

18. The system of either claim 1 or 15 wherein said excitation means is a plasma and includes means for introducing a spectroscopic sample to be analyzed into said plasma to raise said sample to spectroemissive levels.

19. A spectrometer system comprising a filtering monochromator, a resolving monochromator, each said monochromator having an entrance aperture, a dispersing element for dispersing radiation in a beam passing through its entrance aperture into a spectrum, and an exit aperture, the exit aperture of said filtering monochromator being aligned with the entrance aperture of said resolving monochromator, wavelength scanning means for moving said dispersing elements of said filtering and resolving monochromators concurrently to shift the spectral wavelength provided by said resolving monochromator at its exit aperture, and an order selection mechanism for changing the order of the spectral wavelength provided by one of said monochromators without changing the order of the spectral wavelength provided by the other monochromator.

20. The system of claim 19 wherein said wavelength scanning means includes a drive element common to both of said dispersing elements.

21. The system of claim 19 wherein said order selection mechanism includes control means for causing said filtering monochromator to provide second order spectral radiation to said resolving monochromator over a low portion of the spectral range of interest and to provide first order spectral radiation to said resolving monochromator over a higher portion of the spectral range of interest.

22. The system of claim 19 wherein said order selection mechanism comprises first and second drive elements for the dispersing element of said filtering monochromator, and control means for selecting one drive element for a first portion of the spectral range of said system and for selecting the other drive element for a second portion of said spectral range of said system.

23. The system of claim 22 wherein each said drive element is a lever arm that cooperates with and engages a translatable drive surface for rotating the dispersing element.

24. The system of claim 23 and further including ultraviolet radiation filtering means interposable in the radiation path between the entrance aperture and dispersing element of said filtering monochromator, and control means to interpose said ultraviolet radiation filtering means in said radiation path concurrently with the selection of said one drive element.

25. The system of claim 24 wherein said wavelength scanning means includes a stepper motor drive.

26. The system of either claim 19 or 25 and further including source means for generating sample radiation to be analyzed, and source scanning means in the radiation path between said source means and the entrance aperture of said filtering monochromator.

27. The system of claim 26 wherein said source means is an inductively coupled plasma system.

28. The system of claim 27 wherein each said dispersing element is a plane ruled diffraction grating mounted for rotation about a stationary pivot axis parallel to its rulings.

29. A spectroanalytical system comprising an inductively coupled plasma system, means for introducing a spectroscopic sample to be analyzed into said plasma to raise said sample to spectroemissive levels, said plasma extending along an axis, spectrum producing means having an entrance aperture, an exit aperture, first and second radiation dispersing elements arranged for serially dispersing radiation that passes through said entrance aperture, drive means for moving said first and second dispersing elements simultaneously and at different rates such that the spectral order of radiation from said plasma as dispersed by said first dispersing element is different from the spectral order of radiation dispersed by said second dispersing element, control means for causing said drive means to move said first and second dispersing elements simultaneously and at the same rate, means for directing radiation from said plasma to said entrance aperture, and a radiation sensor responsive to radiation passing through said exit aperture.

30. The system of either claim 1 or 29 and further including a calibrating radiation source having a plurality of discrete known spectral lines, and means for directing radiation from said radiation source to said entrance aperture.

31. The system of claim 30 wherein said radiation directing means includes a lens and a mirror mounted for coordinated movement.

32. The system of claim 29 wherein each said dispersing element is a plane ruled diffraction grating mounted for rotation about a stationary pivot axis parallel to its rulings, each grating has a cam follower assembly coupled thereto, and said drive means includes two cooperating cam surfaces, each said cooperating cam surface being driven in translation at the same rate to drive the cooperating cam follower assembly and rotate its grating.

33. The system of claim 32 wherein each said cam follower assembly includes a carrier member that has a conical surface at one end and a spherical surface eccentrically located relative to the axis of said conical surface at its opposite end, a support member that has a conical seat, the conical surface of said carrier member being received in said conical seat so that rotation of said carrier member changes the effective length of said cam follower assembly, and means for clamping said carrier in said seat.

34. The system of claim 30 wherein said calibrating source has a plurality of discrete spectral lines of known wavelength interval spaced less than about one hundred angstroms apart, and means to use said plurality of spectral lines as a reference index.

35. The system of claim 34 wherein said plurality of spectral lines is a triplet.

36. The system of claim 35 wherein said calibrating source is a mercury discharge lamp.

37. In a spectroanalytical system comprising spectrum producing means having an entrance aperture, a dispersing element for dispersing radiation in a beam passing through its entrance aperture into a spectrum, and an exit aperture, said dispersing element being a plane ruled diffraction grating mounted for rotation about a stationary pivot axis parallel to its rulings, said grating having a cam follower assembly coupled thereto, and drive means including a cooperating cam surface, the improvement wherein said cam follower assembly includes a carrier member that has a conical surface at one end and a spherical surface eccentrically located relative to the axis of said conical surface at its opposite end, a support member that has a conical seat, the conical surface of said carrier member being received in said conical seat so that rotation of said carrier member changes the effective length of said cam follower assembly, and means for clamping said carrier in said seat.

* * * * *